United States Patent Office 2,696,491
Patented Dec. 7, 1954

2,696,491

SOLUBILIZED SULFATHIOUREA SALT OF HOMOSULFANILAMIDE

Robert Behnisch and Joseph Klarer, Wuppertal-Elberfeld, Germany, assignors to Schenley Industries, Inc., New York, N. Y., a corporation of Delaware No Drawing. Application February 18, 1953, Serial No. 337,694

Claims priority, application Switzerland December 10, 1949

1 Claim. (Cl. 260—397.7)

This invention relates to sulfonamides and allied compounds useful in therapeutics and has, for an object, the provision of improved, more readily water soluble, therapeutic compounds of this type, and methods or processes for producing the improved compounds.

It is known that compounds of salt-like character, prepared by forming an ammonium type quaternary nitrogen sale of substantially equimolecular proportions of an acid-reacting aromatic sulfonamide, as the anion, with a basic-reacting aromatic sulfonamide, as the cation, have proved to be especially suitable for combating both aerobic and anaerobic bacterial infections as the components of these salts act synergistically to give an activity substantially greater than the sum of the activities of both components. An outstanding example of this type of salt is the 1-sulfanilyl-2-thiourea salt of 4-homosulfanilamide, which may be represented by the formula:

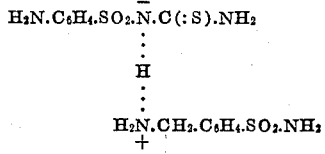

However, these salts have the disadvantages, generally, of being only slightly soluble in cold water and of being irritating to tissue, causing necrosis, so that they are unsuited for injection purposes. Heretofore, attempts at conversion of these salts into more soluble forms, as by treatment with acids or alkalis, eliminated the characteristic salt-like linkage, indicated by the dotted line in the formula above, which is reflected, for instance, by a considerable decrease of their therapeutic activity and compatibility.

It is now discovered, unexpectedly, that the ammonium type quaternary nitrogen salt of the type above mentioned can be converted into a derivative that is readily water-soluble by condensing this salt, in equimolecular proportions, with an α:β-unsaturated aromatic aldehyde alkali metal bisulfite addition product, and particularly the addition product of 1 mol cinnamaldehyde with two mols of sodium bisulfite. The compound thus obtained is readily soluble in water and, surprisingly, retains the characteristic salt-like linkage of the starting material. The new compound is distinguished by very good compatibility, irritation following injection is wholly lacking, it has full therapeutic activity and has proved to be excellently suited for administration by injection. The ready water-solubility of the compound facilitates the preparation of relatively concentrated, hence minimum volume, solutions for parenteral administration.

The ammonium type quaternary nitrogen salt, referred to hereinafter, for convenience, as bimolecular sulfa salt, that is suitable for use in the preparation of the novel compound of this invention is that obtained by reaction of substantially equimolecular proportions of the basic-reacting sulfonamide, 4-homosulfanilamide, with the acid-reacting sulfonamide, 1-sulfanilyl-2-thiourea (sulfathiourea).

Of the unsaturated aromatic aldehydes which may be converted to alkali metal bisulfite addition products and condensed with the above-mentioned bimolecular sulfa salt to yield the products of this invention, cinnamaldehyde is chiefly preferred.

It will be evident from the foregoing that the compound of this invention is the substance represented by the formula:

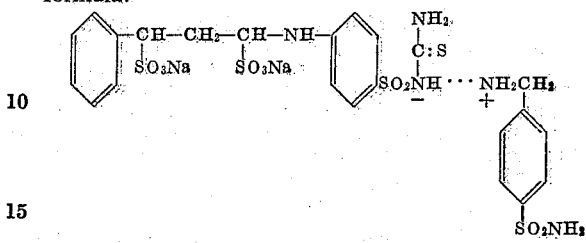

The reactions for making the product of this invention may be carried out by heating the component reactants, in substantially equimolecular proportions, in water or in another suitable solvent. For instance, the 1-sulfanilyl-2-thiourea may be reacted with a substantially equimolecular proportion of the cinnamaldehyde-sodium bisulfite addition compound and this product subsequently may be reacted with the 4-homosulfanilamide. Alternatively, the desired reaction product may also be formed by reacting the bimolecular sulfa salt with the cinnamaldehyde to form an azomethine compound, then subsequently causing the same to react with an alkali metal bisulfite. A third method for making the product of this invention involves first reacting the 1-sulfanilyl-2-thiourea with the cinnamaldehyde to form the azomethine compound, then effecting salt formation with the 4-homosulfonamide and finally adding alkali metal bisulfite to form the aldehyde bisulfite addition compound of the bimolecular salt.

It is surprising, indeed, and most unexpected that the compound of this invention is capable of preparation and, further, that, when prepared, is a stable, readily water-soluble substance retaining its characteristic covalent linkage (indicated by the dotted linkages in the foregoing formula). It would have been expected that the cinnamaldehyde sodium bisulfite addition product would react, not with the 4'-amino group of the 1-sulfanilyl-2-thiourea, but instead with the aminoethyl group of the 4-homosulfanilamide, with resultant destruction of the covalent linkage that imparts salt-like character to the product.

Isolation of the new substance may be achieved in various ways. For instance, the solution of the product obtained may be concentrated, causing the new compound slowly to precipitate, on standing, as coarse crystals, which may be separated on a suction filter or by centrifuging. The concentrated solution may also be treated with certain water-miscible organic solvents, for instance, ethanol, methanol, or acetone, to effect precipitation of the polar bimolecular salt derivative which, thus, is obtained in finely powdered or amorphous form.

If pure materials are used as reactants and contamination during reaction is avoided, the resulting solution of the new product may be employed directly for therapeutic purposes (after adjusting to the desired concentration and filtering).

To facilitate a better understanding of the subject matter of this invention, certain specific examples follow which are provided by way of illustration merely, not by way of limitation of the scope of the invention.

*Example 1*

Preparation of the substance having the formula:

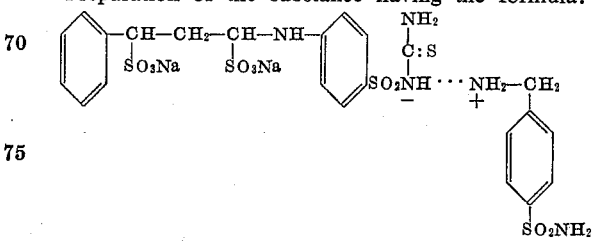

A solution of about 208 grams of sodium bisulfite in 800 cubic centimeters of water is mixed with approximately 132 grams of cinnamaldehyde and the mixture is heated on a water bath, with stirring, until a clear solution is obtained and the cinnamaldehyde-odor has disappeared. About 376 grams of the 1-sulfanilyl-2-thiourea salt of 4-aminomethyl-benzene-1-sulfonamide (4-homosulfanilamide) are introduced into the solution and the mixture is heated to a temperature in the range of about 80° C. to 90° C., for one hour. The resultant solution is filtered until clear, concentrated in vacuo to a small volume, and cooled under refrigeration, causing an initial production of long, coarse crystals which cause solidification of the whole mass. The precipitate is squeezed or pressed to separate entrapped liquid, washed with dilute alcohol, and dried. A colorless crystalline powder is thus obtained, which is very readily soluble in water to yield a solution with neutral reaction which may be sterilized without decomposition.

*Example 2*

An alternative procedure of producing the compound of the formula in Example 1 is as follows:

Approximately 46 grams of 4-aminobenzene-1-sulfonic acid thiocarbamide and 26.5 grams of cinnamaldehyde are boiled in 300 cubic centimeters of alcohol for 3 hours under reflux. The condensation product precipitates as a yellow resin which solidifies, on cooling, to a crystalline form. About 34 grams of this condensation product are boiled with 80 grams of 35 per cent sodium bisulfite solution and 200 cubic centimeters of water until the starting materials are almost completely dissolved. The yellow solution is filtered until clear and 36 grams of 4-aminomethyl-benzene-1-sulfonamide are slowly stirred in. Salt formation is effected immediately, as shown by the reaction solution not reacting alkaline upon the addition of the strong base, unless, of course, an excess of base is added. The solution so obtained is treated further and the reaction product isolated as described in Example 1.

This application is a continuation-in-part of application Serial Number 200,119 filed December 9, 1950, by the same inventors entitled "Therapeutic Compounds and Methods of Production" (now abandoned).

Having thus described the subject matter of this invention, what it is desired to secure by Letters Patent is:

As a novel chemotherapeutic agent, a substance represented by the formula:

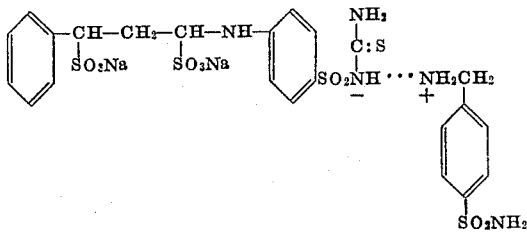

References Cited in the file of this patent

UNITED STATES PATENTS

| Number | Name | Date |
| --- | --- | --- |
| 2,262,544 | Despois | Nov. 11, 1941 |
| 2,493,632 | Lott | Jan. 3, 1950 |